United States Patent [19]

Paisley et al.

[11] Patent Number: 5,136,117
[45] Date of Patent: Aug. 4, 1992

[54] MONOMERIC RECOVERY FROM POLYMERIC MATERIALS

[75] Inventors: Mark A. Paisley, Upper Arlington; Robert D. Litt, London, both of Ohio

[73] Assignee: Battelle Memorial Institute, Columbus, Ohio

[21] Appl. No.: 571,196

[22] Filed: Aug. 23, 1990

[51] Int. Cl.$^5$ .............................................. C07C 4/22
[52] U.S. Cl. .................................... 585/241; 505/648
[58] Field of Search ........................................ 585/241

[56] References Cited

U.S. PATENT DOCUMENTS 3,901,951 7/1975 Nishizaki .............................. 585/241
4,584,421 4/1986 Saito et al. ............................ 585/241

OTHER PUBLICATIONS

R. G. Graham et al., Fast Pyrolysis (ultrapyrolysis) of Biomass Using Solid Heat Carriers in *Fundamentals of Thermochemical Biomass Conversion* edited by Overend et al. p. 397.
D. C. Scott et al., Past Pyrolysis of Waste Plastics, Energy from Biomass and Wastes XIV; Lake Buena Vista, Fla., Jan. 29, 1990.
W. Kaminsky, Thermal Recycling of Polymers, Journal of Analytical and Applied Pyrolysis, 1985, vol. 8, pp. 439–448.
Sinn et al., Processing of Plastic Waste and Scrape Tires into Chemical Raw Materials, Especially by Pyrolysis, Angew. Chem. Int. Ed. Engl., 1976, vol. 15, No. 11, pp. 660–672.
T. Sawaguchi et al., Studies on the Thermal Degradation of Synthetic Polymers—Thermal Gasification of Polyolefins, Bulletin of the Japan Petroleum Institute, 1977, No. 2, pp. 124–230.
T. Kuroki et al., Pyrolysis of Polystyrene—Prediction of Product Yields, Nippon Kagaku Kaishi, 1976, No. 11, pp. 1766–1772. Translation Provided.
T. Kuroki et al., Thermal Gasification of Polypropylene, Nippon Kagaku Kaishi, 1976, No. 2, pp. 322–327.
T. Sawaguchi et al., Thermal Gasification of Polyethylene—Prediction of Product Yield, Nippon Kagaku Kaishi, 1977, No. 4, pp. 565–569.

*Primary Examiner*—Asok Pal
*Assistant Examiner*—P. Achutamurthy
*Attorney, Agent, or Firm*—Watkins, Dunbar & Pollick

[57] ABSTRACT

A method is described for the recovery of high yields of monomers from waste and scrape polymeric materials with minimal amounts of char and tar. The process involves pyrolysis in a circulating fluid bed (CFB). The polymer is heated to a temperature of about 650°C. to about 1000°C. at a rate of more than 500°C./sec in less than two seconds. Heat is supplied to the CFB by a stream of hot sand heated in a separate combustor. The sand is also used as the circulating fluid bed material of the CFB. The process is essentially devoid of solid carbon char and non-monomeric liquid products.

33 Claims, 5 Drawing Sheets

MONOMERIC RECOVERY FROM POLYMERIC MATERIALS

BACKGROUND OF THE INVENTION

1. Field of the Invention

This invention relates generally to a process for recovering monomers from polymers by pyrolysis. More particularly, the process is characterized by high heating rates and short residence times.

2. Description of the Prior Art

Increasing amounts of scrap and waste plastics have created ever expanding disposal problems for both industry and society in general. Plastics account for about 7% by weight of municipal solid waste and a larger percentage, 14–21%, by volume according to an Environmental Protection Agency report to Congress, "Methods to Manage and Control Plastic Wastes." The report predicts that plastic wastes will increase 50% by weight by the year 2000. Incineration, landfilling, source reduction and recycling are currently viewed as the main solutions to this mounting problem. Currently the main focus is on recycling through grinding separated wastes and re-melting or re-processing. Such materials, in general, are limited in use to low quality plastics such as decorative (non-load bearing) artificial lumber or are used in small amounts as filler in other plastics. Even these applications require relatively uniform polymer compositions that can only be achieved by expensive presorting of materials. Alternatively some preliminary work has begun on the conversion of plastics to fuels.

Sawaguchi et al and Kuroki et al have worked with the thermal gasification of polymers. In their paper, "Thermal Gasification of Polypropylene," Takashi Kuroki et al, Nippon Kagaku Kaishi, 1976, No. 2, pp. 322–327, a fixed-bed (Raschig ring) flow system using superheated steam as the heating agent was used to obtain a 26 wt % yield of propylene from polypropylene. A combined 40 wt % yield of ethylene, propylene and isobutylene was obtained. Residence times were 1.3–2.7 sec and the temperature ranged from 500°–650° C. The maximum yield of propylene was obtained with about a 25 wt % yield of carbon residue and a 15 wt % yield of liquid components.

In their paper, "Pyrolysis of Polystyrene—Prediction of Product Yield," Takashi Kuroki et al, Nippon Kagaku Kaishi, 1976, No. 11, pp. 1766–1772, the authors show the use of a fixed-bed flow system utilizing superheated steam as the heating medium to obtain a maximum yield of 60% monomeric styrene from polystyrene at 550° C. with about a 20% yield of heavy oils. Residence times were 3.1–18.2 sec using a feed of molten styrene.

In the paper, "Thermal Gasification of Polyethylene-Prediction of Product Yield," Takashi Sawaguchi et al, Nippon Kagaku Kaishi, 1977, No. 4, pp 565–569, the authors achieved a 32 wt % yield of ethylene from polyethylene using a fixed bed reactor with superheated steam as the heat carrier at a temperature of 650° C. and a residence time of 3.2–3.4 sec. A total yield of 58 wt % of ethylene, propylene and 1-butene was obtained. A temperature range 590°–800° C. and residence times of 0.6–6.5 sec were studied. An increasing amount of carbon residue (15–30 wt %) was observed with increasing reaction temperature while liquid products decreased from about 40% to about 10%.

In the paper, "Studies on the Thermal Degradation of Synthetic Polymers—Thermal Gasification of Polyolefins," Bulletin of the Japan Petroleum Institute, T. Sawaguchi, 1977, No. 2, pp. 124–130, the authors summarize their previous data for polyethylene and polypropylene and give additional data for polyisobutylene. It is generally noted that methane and solid carbon residues increase with increasing temperature under the conditions used.

Sinn et al, "Processing of Plastic Waste and Scrap Tires into Chemical Raw Materials, Especially by Pyrolysis," Angew. Chem. Int Ed. Engl., 1976, Vol. 15, No. 11, pp. 660–672, have investigated the pyrolysis of waste plastic in a fluidized bed of sand. Polyethylene was found to yield 33.8 and 44.7 wt. % ethylene at 740° and 840° C., respectively. The carbon residue increased from 0.4 to 1.4 wt % with increasing temperature. Aromatic compounds increased from 0.2 to 8.4 wt % with increasing temperature while aliphatic compounds with more than 4 carbons decreased from 4.6 to 1.5 wt %. Polystyrene afforded 79.8 and 71.6 wt % styrene at 640° and 740° C., respectively; the carbon residue increased from 0.04 to 0.3 wt % while aromatic compounds decreased from 93.9 to 88.9 wt %. Gaseous hydrocarbons of 4 or fewer carbons and hydrogen increased from 0.4 to 0.9 wt %. Polyvinylchloride yielded 56.3 and 56.4 wt % HCl at 740° and 845° C., respectively. Hydrocarbons with 4 or fewer carbons and hydrogen decreased from 6.4 to 5.8 wt % while aromatics increased from 10.9 to 11.5 wt %. Polypropylene yielded 13.9 wt % ethylene, 13.7 wt % propylene, 57.3 wt % hydrocarbons with 4 or less carbons. 19.5 wt % hydrocarbons with more than 4 carbons and 19.8 wt % aromatics at 740° C. A 7:2:2:1 by weight mixture of polyethylene:polyvinylchloride: polystyrene:polypropylene gave 13.2 wt % ethylene, 2.7 wt % propylene, 10.5 wt % styrene, 8.1 wt % HCl, 33.5 wt % hydrocarbons with 4 or less carbons and hydrogen, 3.1 wt % hydrocarbons with more than 4 carbons and 36.7 wt % aromatics. The general objective of these studies was to obtain a high level of aromatics to be used as chemical raw materials and that longer residence times contributed to an increase in aromatics such as toluene and benzene.

W. Kaminsky, "Thermal Recycling of Polymers," Journal of Analytical and Applied Pyrolysis, 1985, Vol. 8, pp. 439–448, in a follow-up to the Sinn et al paper cited above, notes that with mixed plastics, up to 50% of the input is recovered in liquid form corresponding to a mixture of light benzene and bituminous coal tar with about 95% aromatics. The oil is useful for manufacture into chemical products according to usual petrochemical methods. It is noted that optimal reaction management is aimed at high yields of aromatics. Gases from the pyrolysis are used to heat the fluidized bed and for fluidizing the fluidized bed.

D. S. Scott et al, "Fast Pyrolysis of Waste Plastics," Energy from Biomass and Wastes XIV; Lake Buena Vista, Fla., Jan. 29, 1990, sponsored by the Institute of Gas Technology, pp. 1–9, used a fluidized bed of sand or catalyst to study the fast pyrolysis of various polymer articles. Pyrolysis of polyvinylchloride yield 56 wt % HCl, 9.1% char, 6.3% condensate, and 28.6% gases and losses. Pyrolysis of polystyrene at 532°, 615°, and 708° C. yielded 76.2, 72,3, and 75.6 wt % styrene, 12.3, 10.6, and 7.7 wt % other aromatics, and 11.5, 15.7 and 15.2 wt % gases and losses, respectively--similar to the yields reported by Sinn et al cited above. Pyrolysis of polyethylene in a fluidized sand bed yielded 10.4–31.1 wt % ethylene and 2.5-12.8 wt % propylene at 654°-790° C. Condensate (aliphatics boiling at 40°-220° C. and some aromatics) were obtained in 51.1-10.3 wt % yield at 654°-790° C. Char content varied from 0 to 2.1 wt %. Use of an activated carbon fluidized bed yielding liquid hydrocarbons of a low boiling range in better than 60% yield. Scott concludes that it is difficult to obtain high yields of ethylene by pyrolysis and concludes that research should be directed at obtaining hydrocarbon liquids with a high content of aromatics.

Graham et al in their article, Fast Pyrolysis (Ultrapyrolysis) of Biomass Using Solid Heat Carriers, in "Fundamentals of Thermochemical Biomass Conversion", edited by Overend et al, Elsevier Applied Science Publishers Ltd, 1985 suggested using high heating rates for biomass pyrolysis. The main product from biomass pyrolysis was carbon monoxide (73.5-78.4 wt %).

To date, the various studies on the pyrolysis of waste plastics point to the production of a wide range of product mixtures that include large amounts of non-monomeric liquids and solid carbon residues. Until the cost of such liquids drops below the cost of petroleum-based feed stocks, such processes do not appear to be economically viable. As a result, waste or scrap plastics continue to create significant disposal problems for municipalities and plastic producers. So far, the only successful practice has been to shred the materials and combine them with new batches of virgin material. Even such practices require extensive presorting of individual polymers and the use is limited to low-grade non-load bearing plastics or as a low percentage filler in other plastics.

SUMMARY OF THE INVENTION

The present invention solves the prior art waste polymer disposal problem by providing a plastic recovery process that converts mixed plastic wastes into monomer feedstock with minimal, if any, amounts of solid carbon (char) and non-monomeric liquid products. The primary product from the process is ethylene based on the composition of typical polymeric plastic wastes. A product gas containing about 50 volume percent ethylene has been produced from a mixed polymer feedstock. The product gas can be fed to an ethylene purification plant to produce the high purity feedstock for polymerization or other uses using known technology.

The process treats coarsely ground plastic scrap without presorting at high throughputs (over 1000 lb/hr-ft$^2$ of reactor area) to yield the desired products at low cost. As a result, waste plastics can be converted into high value virgin feed material rather than the current low value filler-type products. The high conversion levels achieved along with the compact size of the equipment provide favorable process economics. Preliminary estimates using a mixed plastic feedstock showed that ethylene can be produced for about $0.015 per pound. These costs include all non-feedstock operating and capital related costs for a 500 ton/day recovery plant. The process of this invention converts polymeric materials to monomeric components by heating the polymeric materials to a temperature of about 650° to about 1000° C. in less than about 2 sec. Such pyrolysis temperatures are achieved by heating the polymeric materials at a rate between about 500° to about 50,000° C. per sec at atmospheric pressure. Higher heating rates allow for a reduction in heating time to less than about 0.5 sec or even less than about 0.02 sec.

The process uses a circulating, fluidized-bed reactor (CFB) as the pyrolysis unit to rapidly heat the polymers while preventing recombination to polymer or other undesired by-products. Heat is supplied to the CFB by a stream of hot sand or other heat transfer materials. The sand is heated in a separate combustor using waste gas, fuel gas, coal, oil, natural gas, or other fuel as the heat source. Contaminants present in these materials remain in the circulating phase or exit with the flue gas from the combustor.

The short residence times of less than 2 seconds in the CFB coupled with the extremely high heat up rates caused by incandescent sand particles contacting the plastic particles result in pyrolysis of the plastic without recombination or cracking. Pyrolysis takes place in the range of about 650° C. to about 1000° C. and at atmospheric pressure. For polyolefinic materials, the preferred pyrolysis temperature is about 800° C. to about 900° C.

Initial experiments with a polyethylene feedstock demonstrated that ethylene, as a percentage of the total converted polymer, remained constant with increasing temperature. This was quite unexpected, since one would generally expect an increase in gaseous products such as hydrogen and methane with increasing temperature with a corresponding drop in ethylene concentration. Total conversion to gaseous products was found to linearly increase with temperature. Ethylene concentration in the gas produced was about 60 weight % of the total gas concentration.

CFB pyrolysis unit heating rates of 500°-50,000° C./sec are achieved by initially heating the fluidized bed and heat transfer material in a combustor to a temperature about 100°-200° C. higher than the desired operating temperature of the pyrolysis unit. The heated fluidized bed and heat transfer material is passed into the pyrolysis unit along with a transport gas. Polymeric material is fed to the pyrolyzer by means of a screw or other feeder at a rate of more than about 500 lb/hr ft$^2$ in a manner so as to achieve cocurrent flow. The polymeric material breaks down to monomer and is removed from the reactor in less than about 2 seconds. The heat transfer material is separated by means of a cyclone or other physical separation device and returned to the combustor for reheating. The ratio of fluidized bed heat-transfer and reactor material to polymeric feed material can be 1-100:1 but preferably about 20:1 wt/wt for the above combustor and CFB temperature differences. The ratio of heat transfer material to feed material varies with the temperature difference between the CFB and combustor. The ratio can be as high as about 100:1 or as low as about 1:1.

Typically the CFB heat-transfer material also serves as the CFB circulating fluidized bed. The fluidized-bed heat transfer and reactor bed material can be any suitable material capable of withstanding the combustor and CFB temperatures. Typically refractory materials such as silica, alumina or zirconia or refractory material mixtures are used. Preferably the fluidized bed and heat-transfer material is a silica sand.

Various catalytically-active materials may be used in the CFB, either alone or with other bed materials, to enhance the pyrolysis reaction or otherwise influence the product yield or composition. Such materials include, but are not limited to, zeolites and various metal catalysts including transition metals such as platinum or iron.

In some instances, it is desireable to use chemically-active materials in the CFB either alone or in combination with other fluidized bed materials. For example, calcium oxide may be added to the fluidized bed to eliminate acid gases such as the HCl formed from the pyrolysis of polyvinyl chloride.

Typically a non-oxidizing transport gas is used to circulate and fluidize the bed. Such a transport gas may be essentially inert gases such as nitrogen, argon or helium. Preferably steam is used to improve the yields of monomer. Recycle gas from the fluidized bed may also be used as the transport gas.

According to recent statistics (Modern Plastics, Jan. 1989), polyethylene accounts for about 72% of all packaging materials (31.2% high-density polyethylene (HDPE); 30.9% low-density polyethylene (LDPE); and 10.3% polyethylene (PE), with polystyrene (PS) accounting for another 11.2%; polyvinyl chloride (PVC) 5.5% and 11.0% other). Pyrolysis of individual polymers in this group revealed that in the process of this invention, HDPE was converted in 63 wt % yield at a temperature of 790° C. On the basis of converted product, ethylene was formed in 46 wt % yield. The major remaining products were propylene, butylene, and methane. LDPE was converted in 50 wt % yield at a temperature of 840° C. On the basis of converted product, ethylene was formed in 59 wt % yield. The major remaining products were propylene, butylene, hydrogen and methane. PS was converted in about 21% yield at 870° C. On the basis of a carbon balance, styrene and ethylene were formed in 33 and 21% yield, respectively. The major remaining products were benzene, methane, hydrogen, toluene, acetylene, ethane, $CO_2$, and CO. PVC was converted in about a 50 wt % yield at a temperature of 840° C. On the basis of the converted product, ethylene was formed in 16 wt % yield. Vinyl chloride monomer was not formed. Chlorine was removed as HCl. The major remaining products were hydrogen, propylene, methane, $CO_2$, and CO.

A waste mixture composition of polymeric materials, reflective of packing material production and containing 49.2 wt % LDPE, 34.5 wt % HDPE, 11.3 wt % PS, and 5.0 wt % PVC, yielded a total carbon conversion at 871° C. of 72.7%. On a carbon basis of converted product, the following products were obtained: ethylene 58.0%, methane 18.6%, propylene 10.0%, butylene 6.2%, benzene 2.6% and styrene 1.9%.

The foregoing and other advantages of the invention will become apparent from the following disclosure in which one or more preferred embodiments of the invention are described in detail and illustrated in the accompanying drawings. It is contemplated that variations in procedures, materials structural features and arrangement of parts may appear to a person skilled in the art without departing from the scope of or sacrificing any of the advantages of the invention.

Figure 1:
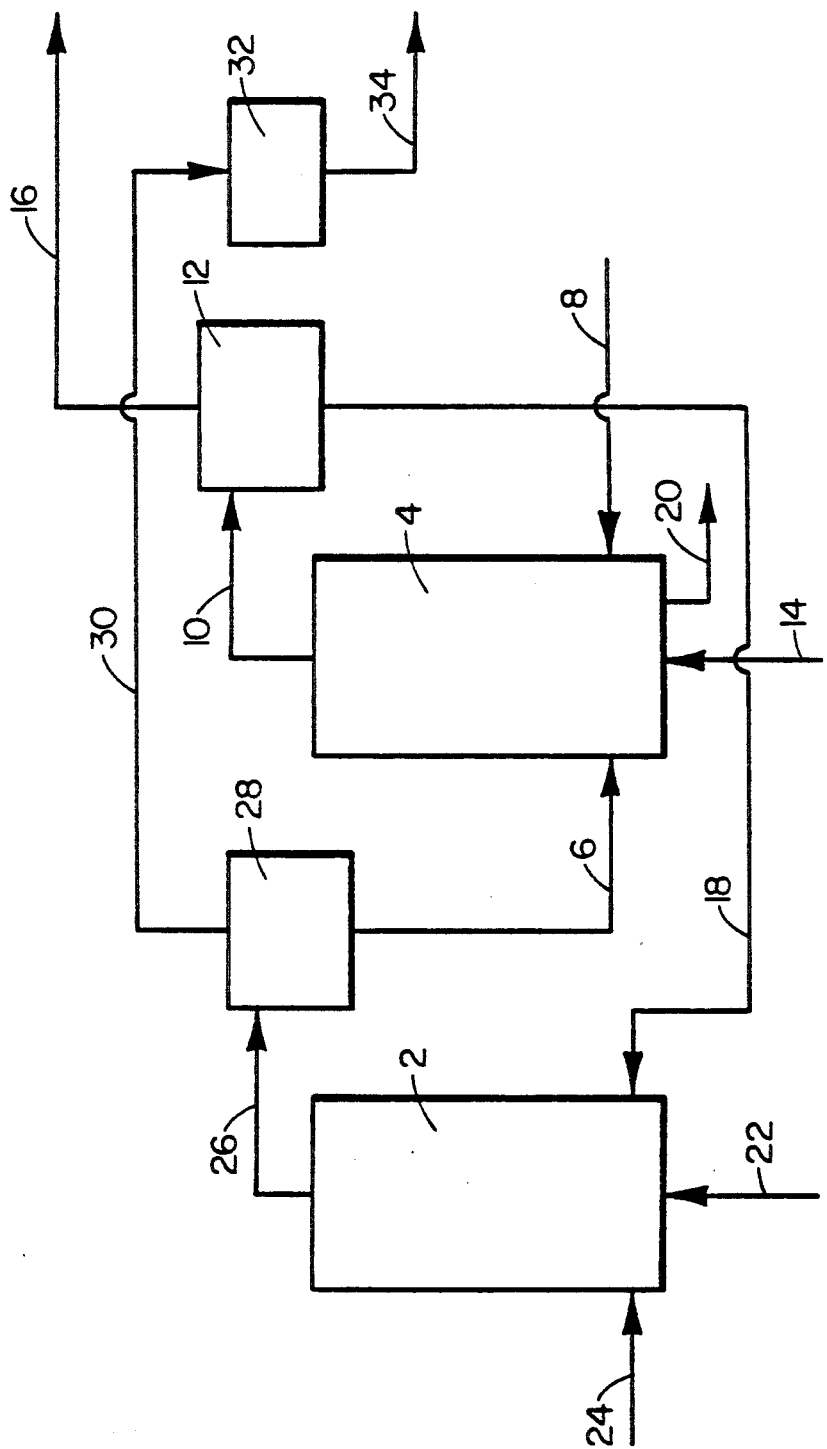
FIG. 1 is a flow diagram of the circulating fluidized bed pyrolysis unit of this invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

DETAILED DESCRIPTION OF THE INVENTION AND BEST MODE FOR CARRYING OUT THE PREFERRED EMBODIMENT

FIG. 1 is a flow diagram of the circulating fluidized bed (CFB) pyrolyzer system of this invention. The CFB pyrolyzer 2 is a 2 inch diameter (5.04 cm) modular unit 10 feet long (305 cm) and made out of stainless steel. Heat is supplied to the CFB pyrolyzer by means of a heat transfer material such as silica sand which enters the pyrolyzer at a rate of 5 to 30 lb./lb. of polymer feed. The heated sand also serves as the fluidized bed material. The grain size of the sand is such that is can be entrained from the reactor.

The sand enters combustor 4, a fluidized-bed combustor, through passage 6. It is heated in combustor 4 using waste gas, fuel gas, coal, oil, natural gas, or other fuel as the heat source. The combustor fuel enters the combustor through line 8. Air enters the combustor through line 14. The sand is heated to a temperature about 100°–200° C. higher than the desired operating temperature of the CFB pyrolyzer unit 2. Ash, if any, from the combustion process is withdrawn from combustor 4 through line 20. After the sand is heated, it enters cyclone 12 through line 10 where gaseous contaminants present in the sand, fuel, or air leave with the flue gas from the combustor 4 through line 16.

The heated sand, along with any additives and solid contaminants, enter the CFB pyrolyzer through line 18. Although sand is preferably used as the heat transfer and CFB reactor material, it is to be understood that other heat-withstanding materials may be substituted for or used along with the sand. A wide variety of refractory-type materials are well known and can also be used as the heat transfer material. Such refractory-type materials include materials such as silica, alumina, and zirconia. Silica sand is preferred because of its availability and low cost.

Catalytically-active materials such as, but not limited to, zeolites and metals such as the transition metals iron and platinum can be used in the CFB to influence the pyrolysis reaction or product yield composition. Chemically-active materials may also be used in the CFB to influence or control the reaction or products.

For example, calcium oxide can be added to eliminate acid gases such as HCl that are formed in the pyrolysis of polyvinyl chloride.

Figure 3:
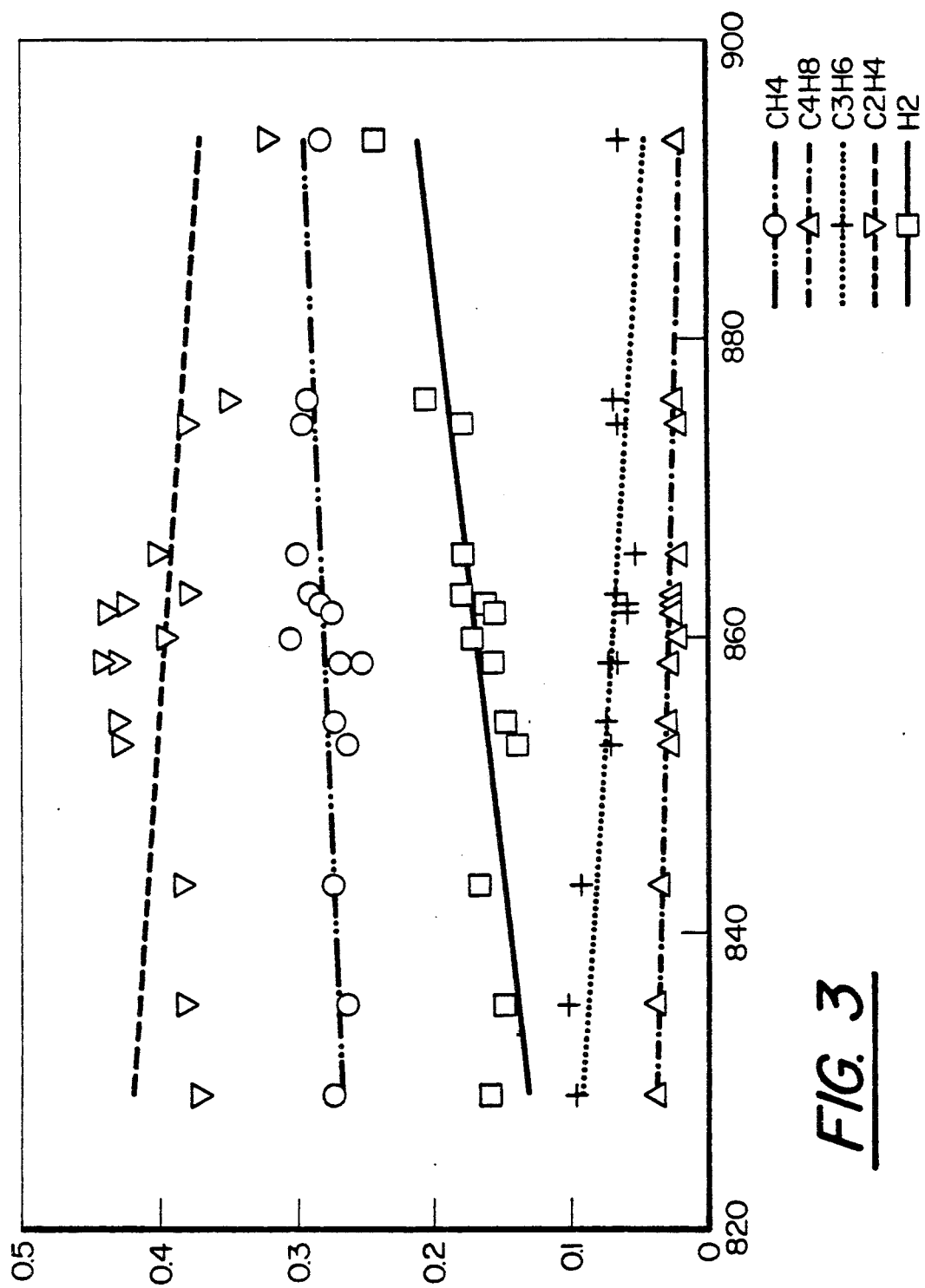
FIG. 3 shows the mole fraction of components in the product gas from the pyrolysis of low-density polyethylene using steam as a transport gas.
Figure 4:
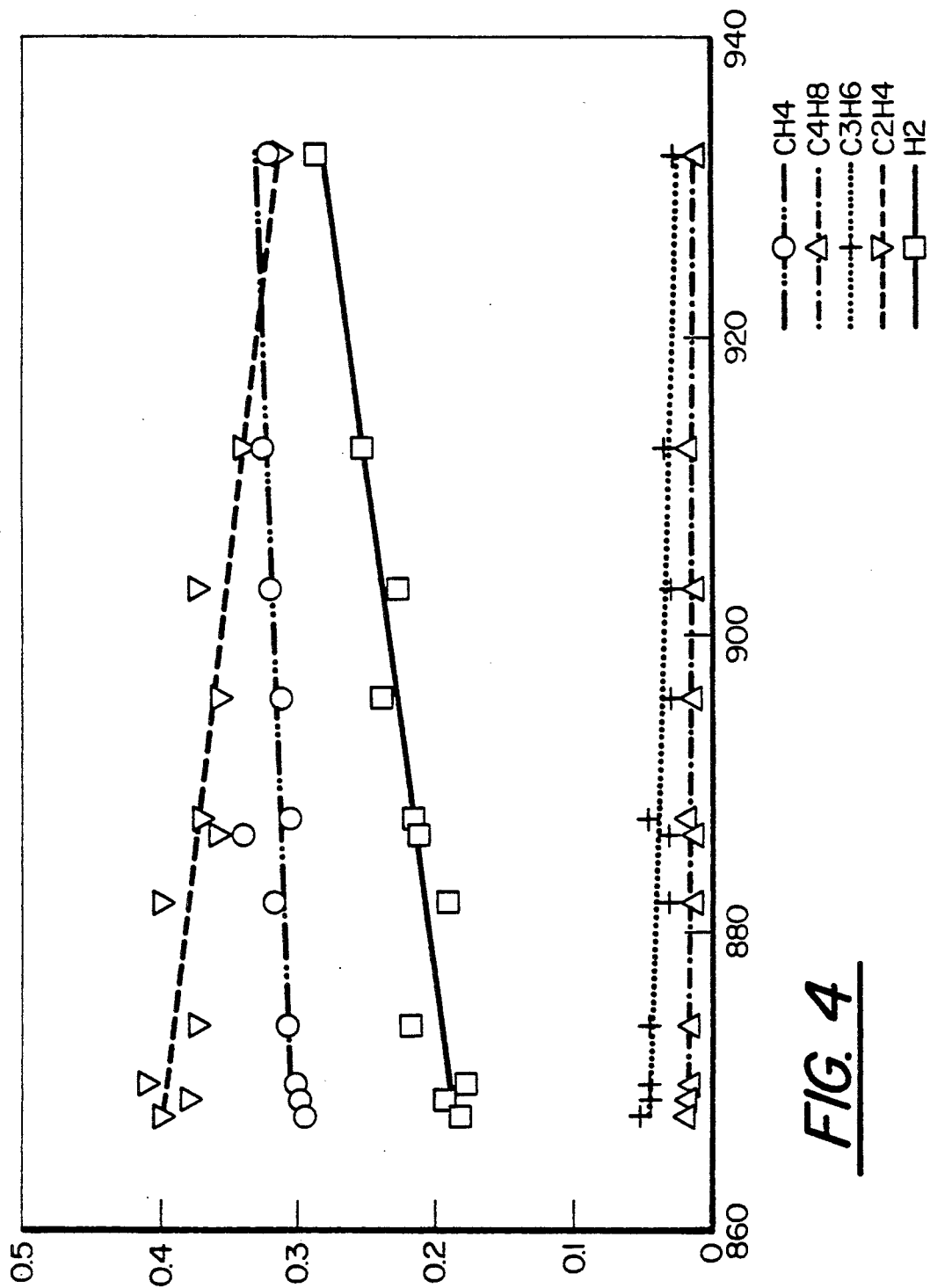
FIG. 4 shows the mole fraction of components in the product gas from the pyrolysis of low-density polyethylene using nitrogen as a transport gas.

Typically a non-oxidizing transport gas such as steam is used to fluidize and circulate the bed in the CFB pyrolyzer 2. The difference in product yield with the use of steam as a transport gas and nitrogen is illustrated in FIGS. 3 and 4. Other transport gases such as argon, helium or recycle gas from the fluidized bed may also be used. The transport gas enters the CFB pyrolyzer 2 through line 22.

The polymeric materials to be fed into the CFB pyrolyzer are coarsely ground to a solid particle size of less than about 1 inch (2.54 cm). Generally, it has been found that the size of the ground material is not a pyrolysis factor but rather a convenient handling size given the size of the pyrolyzer 2 and input line 24. The ground material is fed to the CFB pyrolyzer 2 through line 24 in solid form by means of a screw or other feeder at a rate of about 45 kg/hr (1.2 kg/hr-cm$^2$). The ground polymeric materials preferably pass through the CFB in cocurrent flow with the fluidized bed material. When steam is used as the transport gas, it is feed into the CFB pyrolyzer at a rate less than about 0.6 kg steam per kg of polymeric material. Preferably the ratio of the CFB pyrolyzer heat transfer material, e.g., sand, to the amount of polymer material (feed) in the CFB is about 20:1 wt/wt. The ratio can be as high as about 100:1 and as low as about 1:1. Generally the ratio of sand to polymeric material is adjusted according to the temperature differences between the CFB 2 and the combustor 4.

The polymeric material and its gaseous pyrolysis products spend less than about 2 seconds in the CFB. During this time, they are heated to a temperature of between about 650° C. to about 1000° C. Due to the slip velocity constraints, the sand and some of the solid polymer particles backmix and may reside in the CFB for a somewhat longer period. This longer residence of some polymer particles is not critical to the invention. It is generally known that the time various particles remain in the CFB follows a statistical distribution that is skewed toward longer residence times. Thus it is to be understood that the CFB heating time periods given for polymeric materials in the specification and claims refer specifically to a mean residence time.

Unreacted polymer, reaction products, sand, and steam, leave the CFB pyrolyzer 2 through exit port 26 after which they enter cyclone 28 where the solid and gaseous products are separated. Sand and unreacted polymer reenter the combustor through line 6. The gaseous reaction products and steam leave the cyclone 28 through line 30 and enter cooler 32 where the product monomers are separated from the other gaseous products and steam according to known methodology such as that described in the Kirk-Othmer Encyclopedia of Chemical Technology, Interscience Encyclopedia, Inc. 1950, vol. 5, pp. 890-89. Product monomers leave the cooler through line 34.

Figure 2:
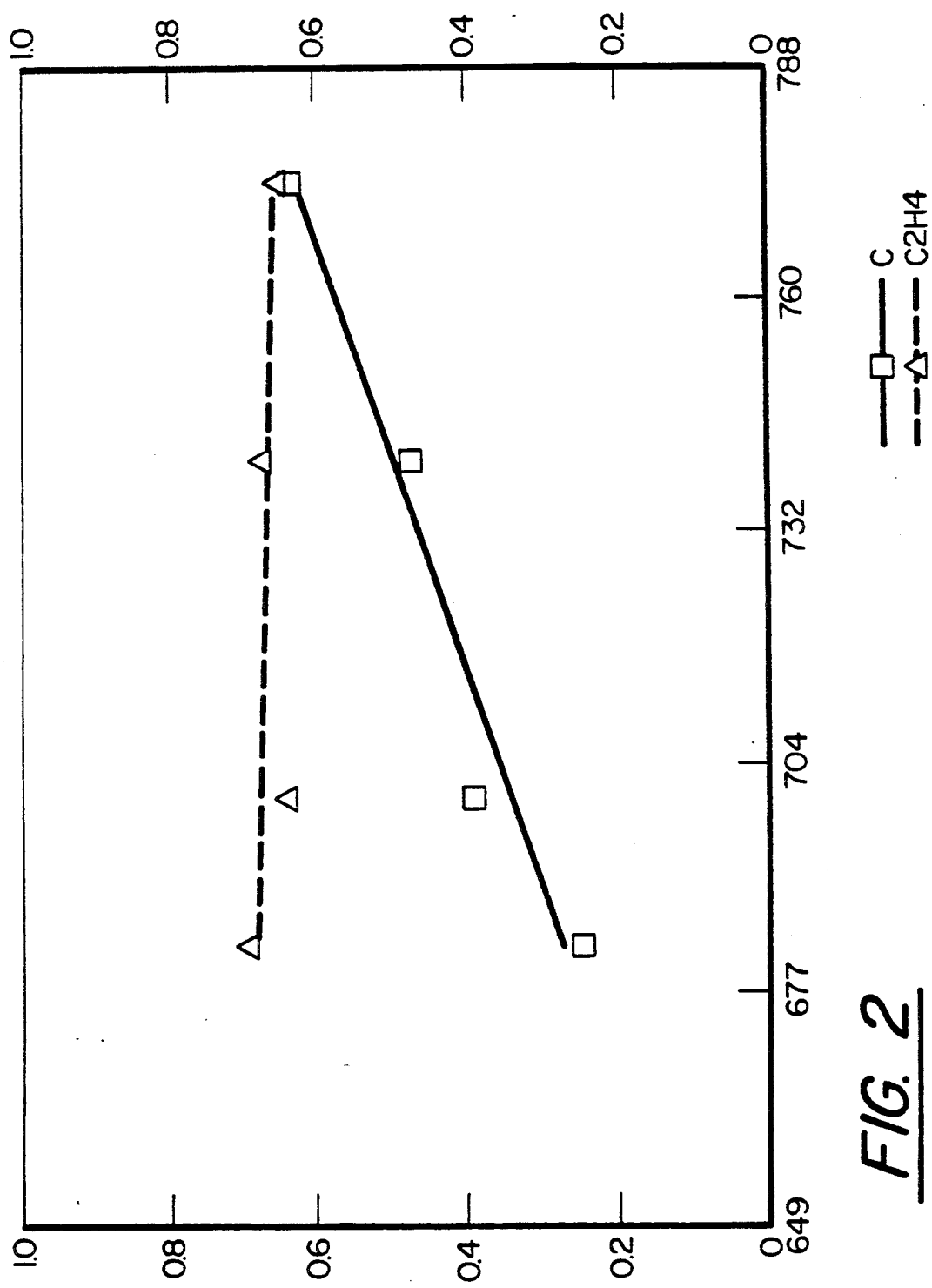
FIG. 2 illustrates the total conversion of polyethylene with temperature and the amount of ethylene produced in the converted material.

Because of the high temperatures and high heat transfer, the above-described system previously would have been expected to yield increasing amounts of final pyrolysis gases such as hydrogen and methane with increasing temperature along with decreasing amounts of monomer concentration. Unexpectedly, and as shown in FIG. 2, it was found that ethylene, as a percentage of total converted polyethylene polymer, remained constant with increasing temperature. Total conversion of polymer to gaseous products increased linearly with temperature.

EXAMPLE 1

Approximately 300 lbs. of silica sand were heated a 12 inch diameter fluidized bed combustor. The sand was heated to a temperature about 100°-200° C. above the desired temperature of a 2 inch diameter 10 foot long CFB pyrolyzer after which it was allowed to circulate into the CFB using steam as a transport gas. The temperature of the pyrolyzer was adjusted to the operating temperature by adjusting the sand circulation rate. About 100 lbs. of low density polyethylene pellets with an average size of about ¼" were fed into the CFB in concurrent flow by means of a screw at a rate of about 20 lbs/hr. Reaction products from the CFB were feed into a cooler and then onto a gas chromatograph system for analysis. Results are given in Table I. Additional data for hydrogen, ethylene, ethane, acetylene, propylene, butylene and methane at various pyrolysis temperatures are graphically displayed in FIG. 3. Carbon monoxide and carbon dioxide were measured at negligible levels.

TABLE I

| Low Density Polyethylene Pyrolysis Products Steam Transport Gas 840° C. Total Carbon Conversion 95% | |
|---|---|
| Product Gas Volume % | |
| Hydrogen | 16.4% |
| Carbon Dioxide | 0.8% |
| Ethylene | 38.2% |
| Ethane | 3.0% |
| Acetylene | 1.2% |
| Propylene | 9.0% |
| Butylene | 3.6% |
| Methane | 27.2% |
| Carbon Monoxide | 0.6% |

EXAMPLE 2

Low density polyethylene was subjected to the CFB pyrolysis reaction described in Example 1 except that nitrogen was used as a transport gas rather than steam. The results are given in Table II. Additional data for hydrogen, ethylene, ethane, acetylene, propylene, butylene and methane at various pyrolysis temperatures are graphically displayed in FIG. 4. Carbon monoxide and carbon dioxide were measured at negligible levels.

TABLE II

| Low Density Polyethylene Pyrolysis Products Nitrogen Transport Gas 870° C. Total Carbon Conversion 53.2% | |
|---|---|
| Product Gas Volume % | |
| Hydrogen | 17.6% |
| Carbon Dioxide | 0.9% |
| Ethylene | 40.9% |
| Ethane | 3.1% |
| Acetylene | 0.7% |
| Propylene | 4.6% |
| Butylene | 1.9% |
| Methane | 30.0% |
| Carbon Monoxide | 0.3% |

EXAMPLE 3

Figure 5:
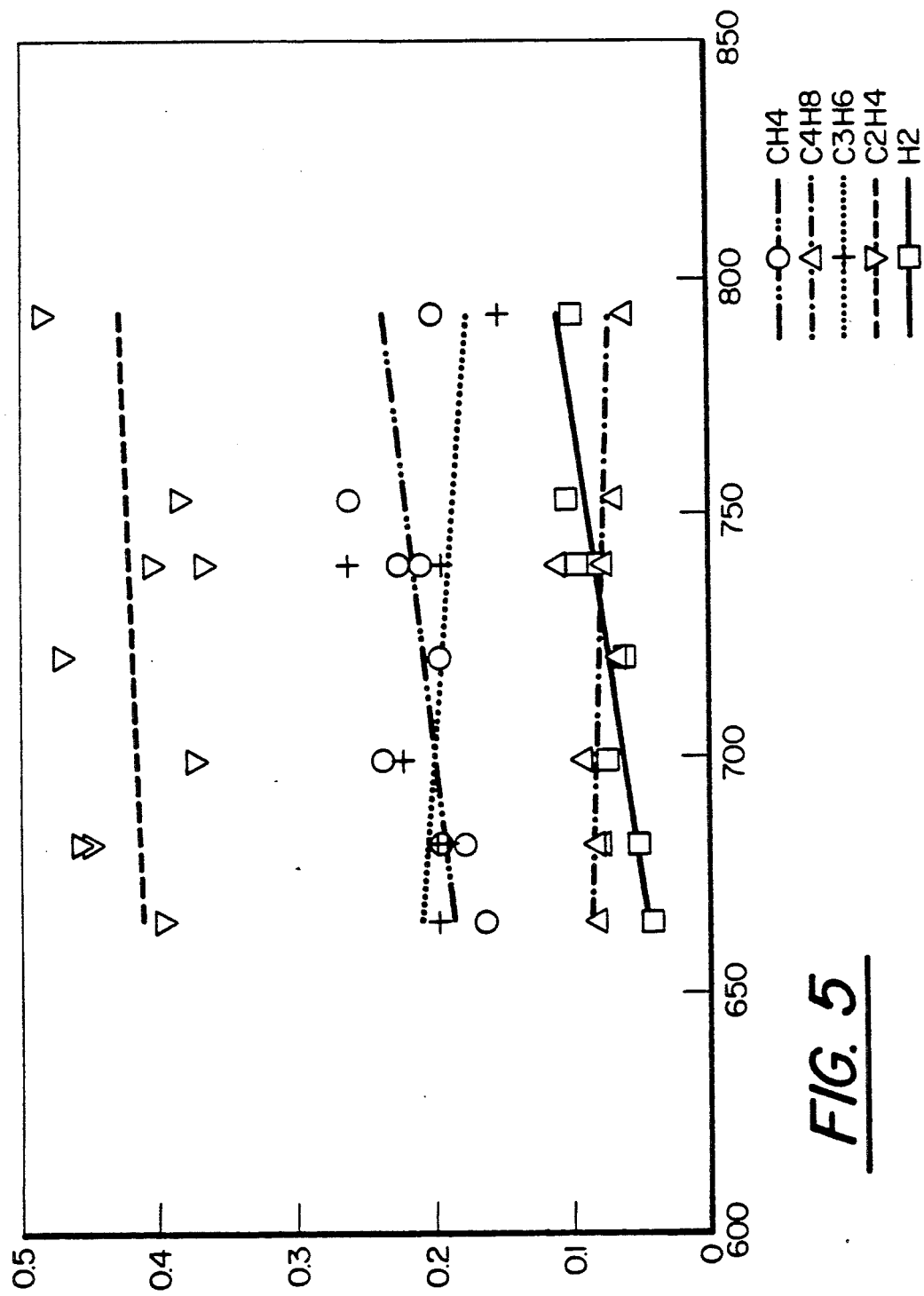
FIG. 5 illustrates the mole fraction of components in the product gas from the pyrolysis of high-density polyethylene using steam as a transport gas.

High density polyethylene was subjected to the CFB pyrolysis reaction described in Example 1. Results are given in Table III. Additional data for hydrogen, ethylene, ethane, acetylene, propylene, butylene and methane at various pyrolysis temperatures are graphically displayed in FIG. 5. Carbon monoxide and carbon dioxide were measured at negligible levels.

TABLE III

High Density Polyethylene Pyrolysis Products
Steam Transport Gas
790° C.
Total Carbon Conversion 88.4%

| Product Gas - Volume % | |
|---|---|
| Hydrogen | 9.8% |
| Carbon Dioxide | 1.7% |
| Ethylene | 48.0% |
| Ethane | 4.3% |
| Acetylene | 1.2% |
| Propylene | 15.2% |
| Butylene | 6.3% |
| Benzene | 0% |
| Styrene | 0% |
| Methane | 19.9% |
| Carbon Monoxide | 0% |

EXAMPLE 4

Polystyrene was subjected to the CFB pyrolysis reaction described in Example 1. Monomer yields and product gas composition are given in Table IV.

TABLE IV

Polystyrene Pyrolysis Products
Steam Transport Gas
870° C.
Total Carbon Conversion 20.8%

| Monomer Yields % of Product Based on Converted Carbon | | Product Gas Volume % | |
|---|---|---|---|
| Ethylene | 20.7% | Hydrogen | 42.9% |
| Toluene | 1.2% | Carbon Dioxide | 4.6% |
| Benzene | 14.2% | Ethylene | 20.1% |
| Styrene | 33.4% | Ethane | 1.2% |
| Methane | 13.0% | Acetylene | 1.1% |
| | | Propylene | 0.5% |
| | | Butylene | 0.3% |
| | | Methane | 26.2% |
| | | Carbon Monoxide | 3.2% |

EXAMPLE 5

Polyvinyl chloride was subjected to the CFB pyrolysis reaction described in Example 1. Results are given in Table V.

TABLE V

Polyvinyl Chloride Pyrolysis Products
Steam Transport Gas
840° C.
Total Carbon Conversion 50.0%

| Product Gas Volume % | |
|---|---|
| Hydrogen | 27.6% |
| Carbon Dioxide | 15.0% |
| Ethylene | 13.9% |
| Ethane | 1.8% |
| Acetylene | 1.2% |
| Propylene | 2.4% |
| Butylene | 0.8% |
| Benzene | 0% |
| Styrene | 0% |
| Methane | 25.6% |
| Carbon Monoxide | 11.8% |

Vinyl chloride monomer was not formed.

EXAMPLE 6

A mixed plastic polymer composition representative of a waste mixture of polymeric materials with a plastic distribution of 49.2 wt % LDPE, 34.5 wt % HDPE, 11.3 wt % PS, and 5.0 wt % PVC was subjected to the CFB pyrolysis reaction described in Example 1. Results are given in Table VI.

TABLE VI

Mixed Polymer Pyrolysis Products
Steam Transport Gas
870° C.
Total Carbon Conversion 72.7%

| Monomer Yields % of Product Based on Converted Carbon | | Product Gas Volume % | |
|---|---|---|---|
| Ethylene | 58.0% | Hydrogen | 17.33% |
| Styrene | 1.9% | Carbon Dioxide | 2.19% |
| Benzene | 2.6% | Ethylene | 41.96% |
| Propylene | 10.0% | Ethane | 2.56% |
| Butylene | 6.2% | Acetylene | 1.01% |
| Methane | 18.6% | Propylene | 4.80% |
| | | Butylene | 2.23% |
| | | Methane | 26.90% |
| | | Carbon Monoxide | 1.06% |

EXAMPLE 7

Under similar reaction conditions to those in Example 1, polypropylene yields ethylene and propylene as the main products. A mixture as used in Example 6 and also containing polypropylene yields additional amounts of monomeric propylene. Refractory materials such as alumina, silica, or zirconia can be substituted for silica sand.

It is possible that changes in apparatus configurations and materials to other than those shown or described could be used but that which is shown is preferred and typical. It is therefore understood that although the present invention has been specifically disclosed with the preferred embodiment and examples, modifications to the design concerning sizing and shape and the materials used may be apparent to those skilled in the art and such modifications and variations are considered to be within the scope of the invention and the appended claims.

We claim:

1. A method for the recovery of a monomeric component from a polymeric material comprising heating said polymeric material in a circulating fluidized-bed reactor at a rate between about 500° C./sec and about 50,000° C./sec to recover said monomeric component by means of a heat transfer material of which the fluidized bed of said reactor is comprised and which circulates through said reactor and a heating means.

2. The method for the recovery of a monomeric component from a polymeric material according to claim 1 wherein said heating means is a combustor.

3. The method for the recovery of a monomeric component from a polymeric material according to claim 2 wherein said combustor is a circulating fluidized bed combustor.

4. The method for the recovery of a monomeric component from a polymeric material according to claim 3 with said heat-transfer material comprising a refractory material.

5. The method for the recovery of a monomeric component from a polymeric material according to claim 4 wherein said refractory material is selected from the group consisting of silica, alumina and zirconia.

6. The method for the recovery of a monomeric component from a polymeric material according to claim 2 wherein said heat-transfer material is a silica sand.

7. The method for the recovery of a monomeric component from a polymeric material according to claim 2 with said circulating fluidized bed comprising a catalytically-active material.

8. The method for the recovery of a monomeric component from a polymeric material according to claim 2 wherein said catalytically-active material is a zeolite.

9. The method for the recovery of a monomeric component from a polymeric material according to claim 7 wherein said catalytically-active material is a transition metal.

10. The method for the recovery of a monomeric component from a polymeric material according to claim 2 within said circulating fluidized-bed comprising a chemically-active material.

11. The method for the recovery of a monomeric component from a polymeric material according to claim 10 wherein said chemically-active material is calcium oxide.

12. The method for the recovery of a monomeric component from a polymeric material according to claim 2 wherein said polymeric material is added to said circulating fluidized-bed reactor in the form of solid particles.

13. The method for the recovery of a monomeric component from a polymeric material according to claim 12 with said solid particles of said polymeric material flowing through said fluidized-bed reactor in cocurrent flow.

14. The method for the recovery of a monomeric component from a polymeric material according to claim 2 wherein a non-oxidizing transport gas is used in said circulating fluidized bed reactor.

15. The method for the recovery of a monomeric component from a polymeric material according to claim 2 wherein steam is used as a transport gas in said circulating fluidized-bed reactor.

16. The method for the recovery of a monomeric component from a polymeric a material according to claim 2 wherein recycle gas is used as a transport gas in said circulating fluidized-bed reactor.

17. The method for the recovery of a monomeric component from a polymeric material according to claim 2 wherein said temperature of said fluidized-bed reactor is about 650° C. to about 1000° C.

18. The method for the recovery of a monomeric component from a polymeric material according to claim 17 wherein said polymeric material is polyolefinic material and said temperature of said fluidized-bed reactor is about 800° C. to about 900° C.

19. The method for the recovery of a monomeric component from a polymeric material according to claim 1 with said polymeric material comprising a waste mixture of polymeric materials.

20. The method for the recovery of a monomeric component from polymeric materials according to claim 1 with said polymeric material comprising low-density polyethylene and said monomeric component comprising ethylene.

21. The method for the recovery of a monomeric component from a polymeric material according to claim 1 with said polymeric material comprising high-density polyethylene materials and said monomeric component comprising ethylene.

22. The method for the recovery of a monomeric component from a polymeric material according to claim 1 with said polymeric material comprising polystyrene and said monomeric component comprising styrene and ethylene.

23. The method for the recovery of a monomeric component from a polymeric material according to claim 1 with said polymeric material comprising polypropylene and said monomeric component comprising propylene and ethylene.

24. The method for the recovery of a monomeric component from a polymeric material according to claim 1 with said polymeric material comprising low density polyethylene, high density polyethylene, polystyrene, and polyvinyl chloride and said monomeric component comprising ethylene.

25. The method for the recovery of a monomeric component from a polymeric material according to claim 24 with said polymeric material further comprising polypropylene.

26. The method for the recovery of a monomeric component from a polymeric material according to claim 15 wherein said steam is provided to said circulating fluid-bed reactor at a flow rate of less than about 0.6 kg of steam per kg of polymeric materials.

27. The method for recovery of a monomeric component from a polymeric material according to claim 1 further comprising separating said monomeric component from other reaction gases.

28. A method for the recovery of a monomeric component from a polymeric material essentially without the formation of solid carbon and non-monomeric liquid components comprising heating said polymeric material in a circulating fluidized-bed reactor at a rate of at least about 500° C./sec so as to recover said monomeric component essentially without the formation of solid carbon and non-monomeric liquid components and wherein said heating of said polymeric material is accomplished by means of a heat transfer material of which the fluidized bed of said reactor is comprised and which circulates through said reactor and a heating means.

29. The method for the recovery of a monomeric component from a polymeric material according to claim 28 wherein said heating means is a combustor.

30. The method for the recovery of a monomeric component from a polymeric material according to claim 29 wherein said combustor is a circulating fluidized-bed combustor.

31. A method for the recovery of a monomeric component from a polymeric material comprising heating said polymeric material at a rate of at least about 500° C./sec to a pyrolysis temperature of about 650° C. to about 1000° C. in less than about 2 sec in a circulating fluidized-bed reactor by means of a heat transfer material of which the fluidized bed of said reactor is comprised and which circulates through said reactor and a heating means.

32. The method for the recovery of a monomeric component from a polymeric material according to claim 31 wherein said heating step is carried out in less than about 0.5 sec.

33. The method for the recovery of a monomeric component from a polymeric material according to claim 32 wherein said heating step is carried out in less than about 0.02 sec.

* * * * *

UNITED STATES PATENT AND TRADEMARK OFFICE
CERTIFICATE OF CORRECTION

PATENT NO. : 5,136,117
DATED : August 4, 1992
INVENTOR(S) : Paisley et al It is certified that error appears in the above-identified patent and that said Letters Patent is hereby corrected as shown below:

In claim 8, column 11, line 11, delete "2" and insert therefor --7--.

Signed and Sealed this

Sixth Day of April, 1993

*Attest:*

STEPHEN G. KUNIN

*Attesting Officer*     *Acting Commissioner of Patents and Trademarks*